(12) United States Patent
Cordes et al.

(10) Patent No.: US 6,406,092 B1
(45) Date of Patent: Jun. 18, 2002

(54) CAR SEAT

(75) Inventors: Heiko Cordes, Wetter; Reinhard Hanauske, Bückeburg; Stefan Krämer, Stadthagen; Ralf Oberbeck, Wunstorf, all of (DE)

(73) Assignee: Bertrand Faure Sitztechnik GmbH & Co. KG, Stadhagen (DE)

( * ) Notice: Subject to any disclaimer, the term of this patent is extended or adjusted under 35 U.S.C. 154(b) by 0 days.

(21) Appl. No.: 09/466,667

(22) Filed: Dec. 20, 1999

(30) Foreign Application Priority Data

Dec. 22, 1998 (DE) .......................................... 198 59 238

(51) Int. Cl.$^7$ .......................... B60N 2/427; B60R 21/00
(52) U.S. Cl. ......................... 297/216.16; 297/216.15; 297/216.18; 297/216.19; 297/216.2; 297/344.13; 297/344.15
(58) Field of Search ......................... 297/216.16, 216.1, 297/216.15, 216.18, 216.19, 216.12, 344.13, 344.15, 344.16

(56) References Cited

U.S. PATENT DOCUMENTS

| | | | | | |
|---|---|---|---|---|---|
| 2,401,748 A | * | 6/1946 | Dillon | ............... | 297/216.16 X |
| 3,269,774 A | * | 8/1966 | Hildebrandt | ........... | 297/216.18 |
| 3,423,124 A | * | 1/1969 | Hewitt | ................... | 297/216.19 |
| 3,524,678 A | * | 8/1970 | DeLavenne | ............... | 297/216.2 |
| 3,582,133 A | * | 6/1971 | DeLavenne | .......... | 297/216.2 X |
| 4,408,738 A | * | 10/1983 | Mazelsky | .......... | 297/216.16 X |
| 4,423,848 A | * | 1/1984 | Mazelsky | .......... | 297/216.16 X |
| 5,022,707 A | * | 6/1991 | Beauvais et al. | ... | 297/216.15 X |
| 5,244,252 A | * | 9/1993 | Serber | .................... | 297/216.19 |
| 5,324,095 A | * | 6/1994 | Yamauchi | .......... | 297/216.16 X |
| 5,558,399 A | * | 9/1996 | Serber | ............... | 297/216.19 X |
| 5,626,203 A | * | 5/1997 | Habib | ............... | 297/216.18 X |
| 6,076,887 A | * | 6/2000 | Andersson | ......... | 297/216.16 X |
| 6,142,564 A | * | 11/2000 | Pajela et al. | ........... | 297/216.18 |

FOREIGN PATENT DOCUMENTS

| | | |
|---|---|---|
| DE | 1 915 503 | 10/1969 |
| DE | 1 904 687 | 9/1970 |
| DE | 195 44 425 | 6/1997 |
| FR | 2 741 573 | 5/1997 |

* cited by examiner

Primary Examiner—Rodney B. White
(74) Attorney, Agent, or Firm—Connolly Bove Lodge & Hutz, LLP

(57) ABSTRACT

A car seat having a seat portion linked by means of connecting rods to a rail for longitudinal adjustment has a dampening element to transform kinetic energy into frictional or deformation energy. The dampening element is embodied as a separate component and has, on the one hand, an articulated link to a component on the seat portion as well as, on the other hand, to another component on the rail for longitudinal adjustment. The components include a threaded rod and a nut that can rotate around it, as well as a sleeve-shaped component that surrounds at least a part of the nut. The nut can be moved longitudinally relative to the sleeve-shaped component while overcoming a force of friction or deformation.

13 Claims, 8 Drawing Sheets

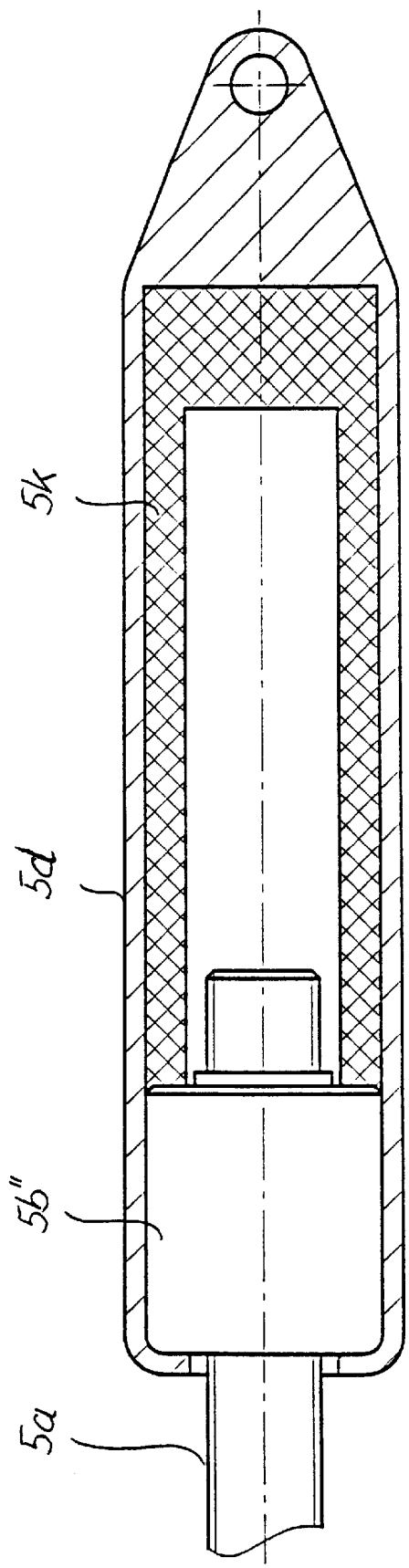

CAR SEAT

BACKGROUND OF THE INVENTION

The invention relates to a car seat, and in particular, a seat including a damping element for absorbing forces which may damage the car seat.

In a known car seat as described in, for example, (DE 195 44 425 A1), the dampening element is integrated in the connecting rods, and takes the form of a horizontal crumple zone that is capable of deformation, connecting two connecting rods which lie opposite each other. Under an excessive load, for example in the case of a collision, the linking elements, consisting of two parallel connecting rods and an integrated connecting area that runs crosswise to them, are destroyed, thereby rendering the entire seat unusable.

In addition, a car seat as described in (FR 2 741 573 A1) has two parallel connecting rods located on opposite sides from each other, connected by means of a torsion tube and a predetermined breaking point in areas that are integrally joined to the chassis. The predetermined breaking point is destroyed when a certain acceleration level is exceeded, and the torsion tube twists under the impact of the forces of acceleration. While this design reduces the forces of acceleration impinging on the seat occupant in the event of a collision, a disadvantage accrues inasmuch as the forces are reduced in an initial phase of movement, but the acceleration energy is not eliminated, being instead stored up due to the elastic characteristics of the torsion tube. This results in a harmful recoil of the seat which can occur when the forces of acceleration abate.

SUMMARY OF THE INVENTION

If the dampening element is provided as a separate component that is at the same time also part of the drive mechanism for the height adjustment, it becomes possible in many instances for the seat, whose guiding elements are then in no way damaged, to easily be completely repaired after an accident. In this case, it is only necessary to replace the dampening element. Furthermore, it is possible in many cases for the dampening element to be refurbished, because only the parts that have suffered wear due to friction or deformation, which have a low cost, need replaced. The selection of materials and the design of the dampening element make it simple to determine the dampening characteristics and energy acceptance capacity.

A car seat comprises a seat portion and a rail. Connecting rods form an articulated link between the seat portion and the rail. A dampening element, having an articulated connection to the seat portion and the rail, is provided. The dampening element includes a threaded rod and a nut that can rotate about the threaded rod. A sleeve-shaped component surrounds at least a part of the nut. The nut is moveable lengthwise relative to the sleeve-shaped component to overcome a frictional or deformation force.

BRIEF DESCRIPTION OF THE DRAWINGS

Various embodiments of the invention are described below in detail with reference to the drawings:

FIG. 10 shows a longitudinal section through a third embodiment of a dampening element with a plastic sleeve made of high-resistance foam.

DETAILED DESCRIPTION OF THE INVENTION

Figure 1:
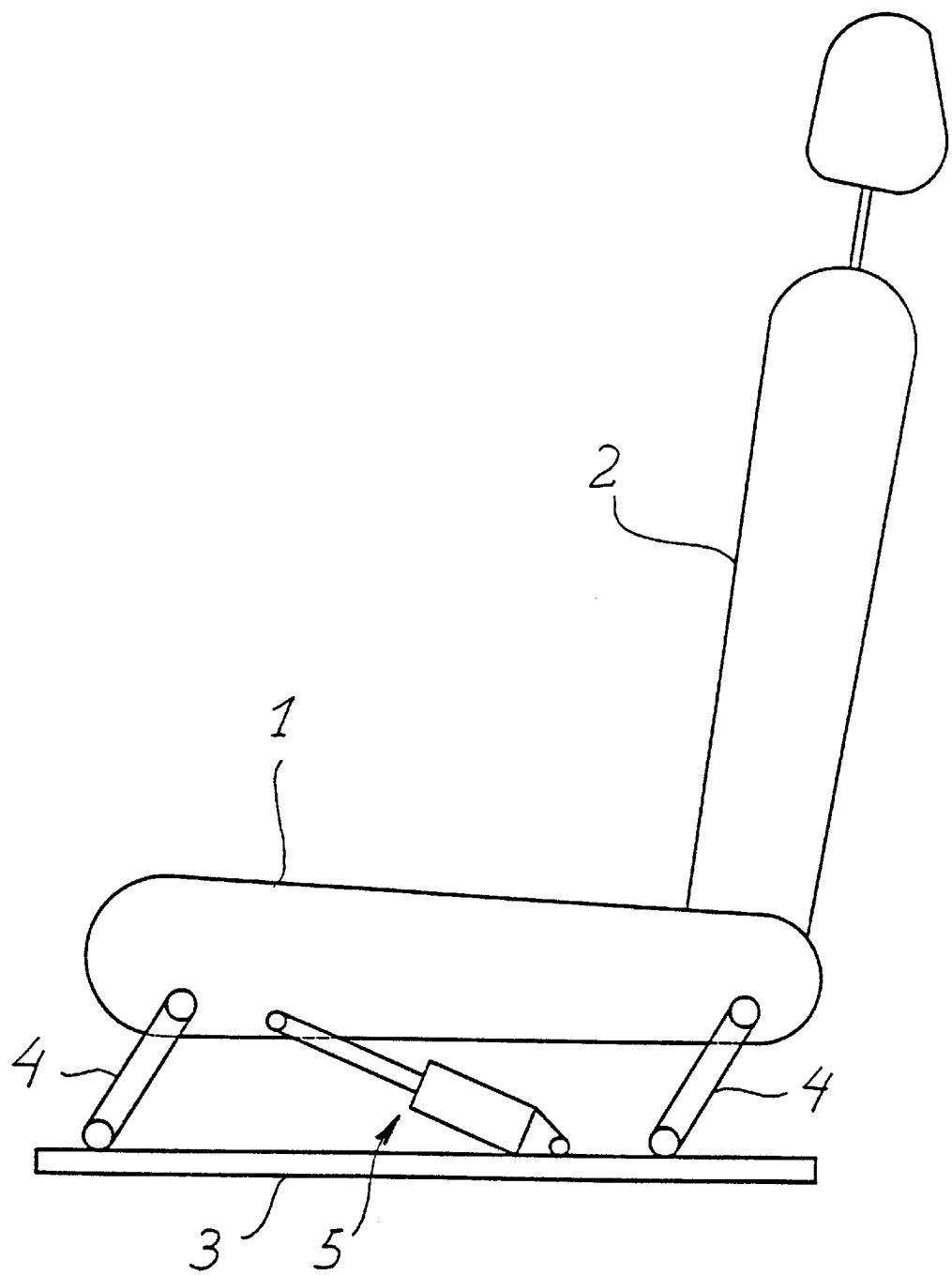
FIG. 1 shows a schematic side view of a car seat with a dampening element.
Figure 2:
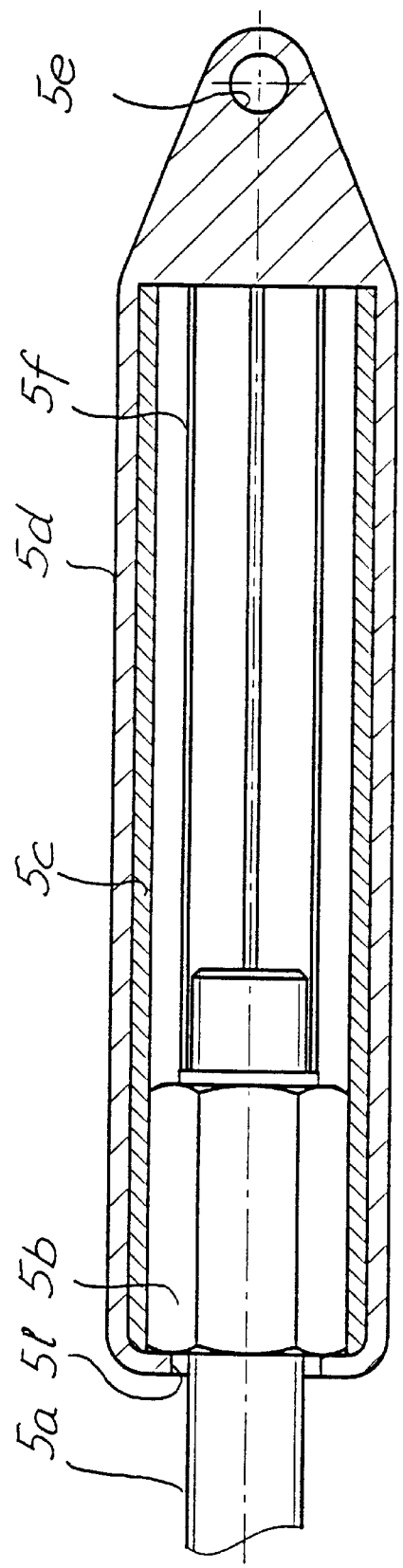
FIG. 2 shows a longitudinal section through a first embodiment of the dampening element in its original position.
Figure 3:
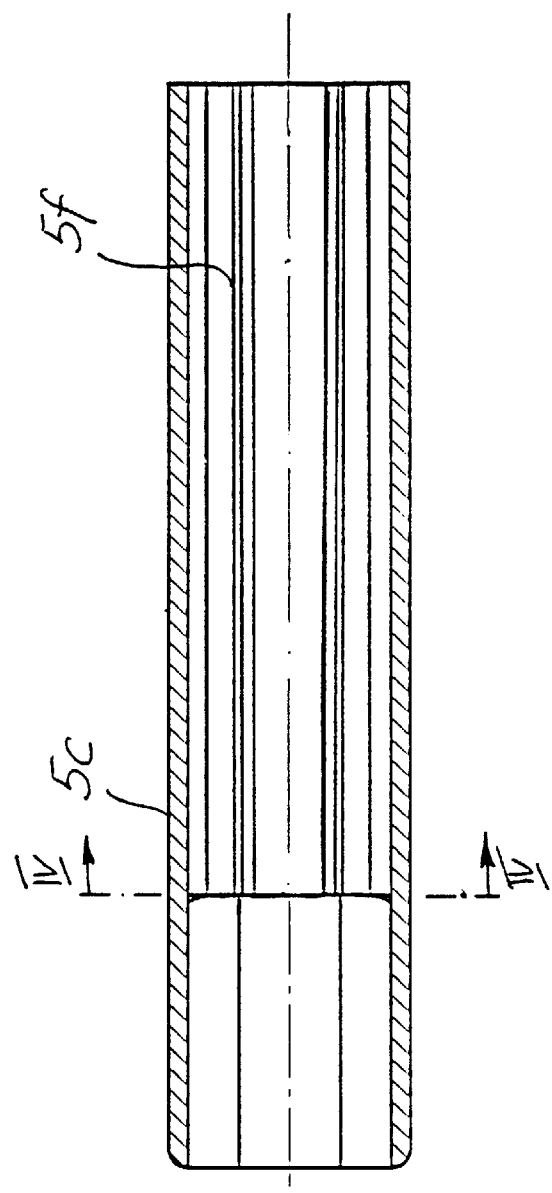
FIG. 3 shows a longitudinal section through a ribbed plastic sleeve of the dampening element according to FIG. 2.
Figure 4:
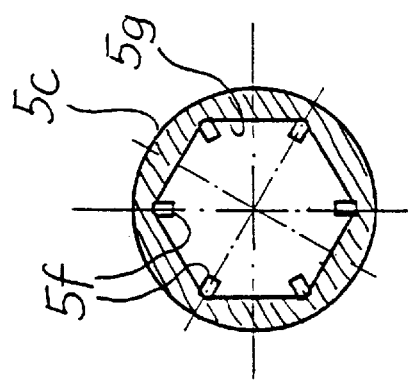
FIG. 4 shows a cross section according to plane IV—IV in FIG. 3.
Figure 5:
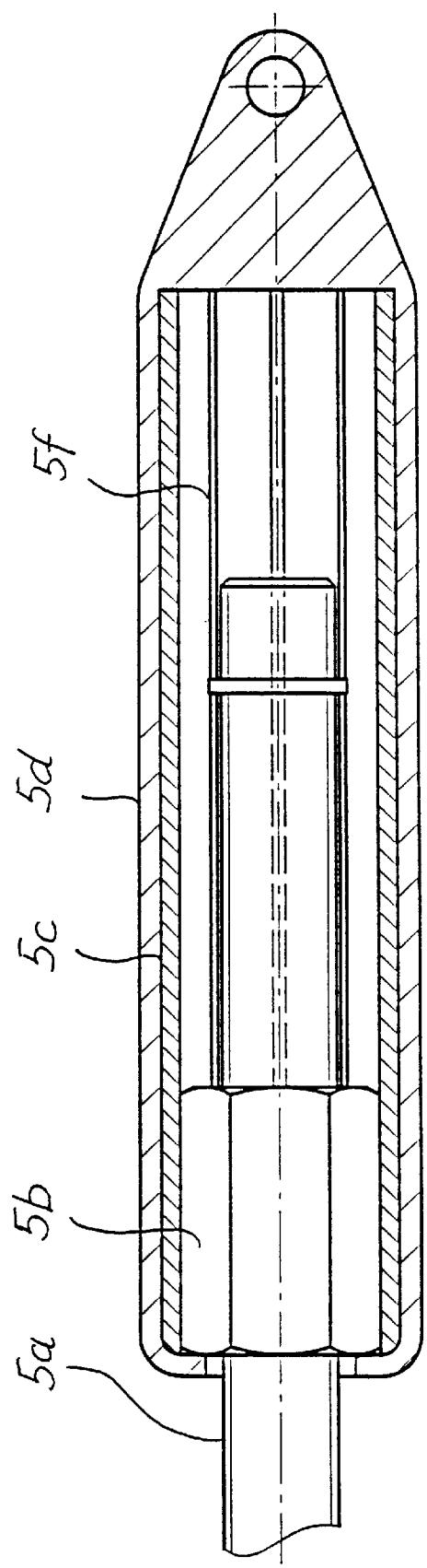
FIG. 5 shows the representation according to FIG. 2, where the height of the seat has been modified from FIG. 2.

In the drawings, identical parts are indicated by identical reference symbols, with apostrophes used to distinguish between them where necessary.

A car seat has a seat portion 1 and a backrest 2. The car seat is mounted so that it can be moved and adjusted in the vehicle's longitudinal direction on a rail for longitudinal adjustment 3. The car seat is connected to the rail for longitudinal adjustment 3 by way of connecting rods 4. Preferably, two connecting rods 4 are located on either side of the seat portion 1, running parallel to each other. The connecting rods 4 can be used to adjust the height or angle of tilt of the car seat. Between the seat portion 1 and the rail for longitudinal adjustment 3, there is a dampening element 5, which is a component of a device used for adjusting the height, not otherwise shown. The dampening element 5 has an articulated connection to, and is placed at a tilted angle to, both the rail for longitudinal adjustment 3 and the seat portion 1.

In the first embodiment of the dampening element 5, shown in FIGS. 2 through 6, a threaded rod 5a engages nut 5b. The threaded rod 5a is turned by a rotational driving device, not shown. To adjust the seat height, the distance between the articulated linking point of the threaded rod 5a where it is joined to the seat portion 1 and the articulated linking point of a sleeve-shaped component 5d that surrounds at least part of the nut 5b is changed by the nut 5b moving along the threaded rod 5a when the latter is rotated. The threaded rod 5a protrudes into the sleeve-shaped component 5d through an entry opening 51. A fastening bore hole 5e, at the opposite end of the component 5d from the entry opening 51 for the threaded rod 5a, serves to articulate the link for the sleeve-shaped component 5d.

A plastic sleeve 5c, whose outer surface is preferably designed with a regular cylindrical shape, is inserted into the sleeve-shaped component 5d. The plastic 5c sleeve has a hexagonal inner contour 5g corresponding to the nut 5b. This inner contour 5g prevents the nut 5b from turning inside the sleeve-shaped component 5d. Ribs 5f protrude into the space inside the plastic sleeve 5c (see FIG. 4) and are arranged at corners of the inner contour 5g. The ribs 5f extend over the entire length of the plastic sleeve 5c with the exception of the area occupied by the nut 5b in its original position. Under normal conditions, the nut 5b is securely held by the ribs 5f in the original position in relation to the sleeve-shaped component 5d to preclude axial movement of the nut 5b. The plastic sleeve 5c is designed so that there is no impediment to screwing the threaded rod 5a into an interior of sleeve 5c for the purpose of adjusting the height of the car seat is adjusted (see FIG. 5).

Figure 6:
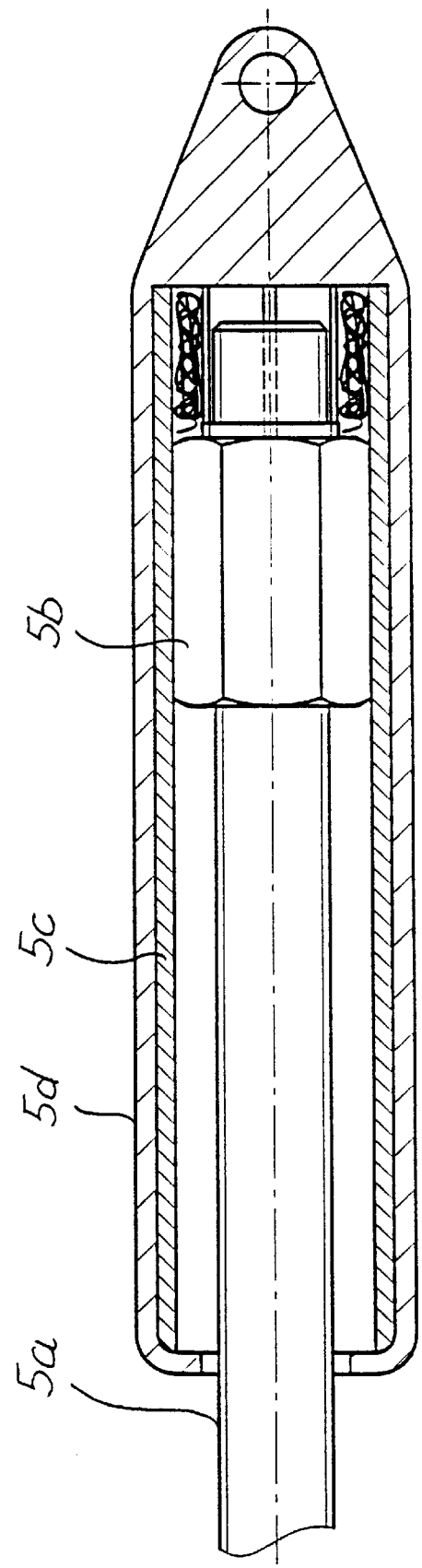
FIG. 6 shows the representation of the dampening element according to FIG. 2 after a collision.

In the event that an excessive load is placed on the dampening element 5, the nut 5b is moved within the sleeve-shaped component 5d, thereby shearing off the ribs 5f which protrude into the range of motion of the nut 5b and compressing the ribs 5f at the end of the area where the nut 5b is being pushed (FIG. 6). Thus, some of the forces of acceleration impinging on the car seat and its occupant are converted into the work of shearing and deforming ribs 5g.

Figure 7:
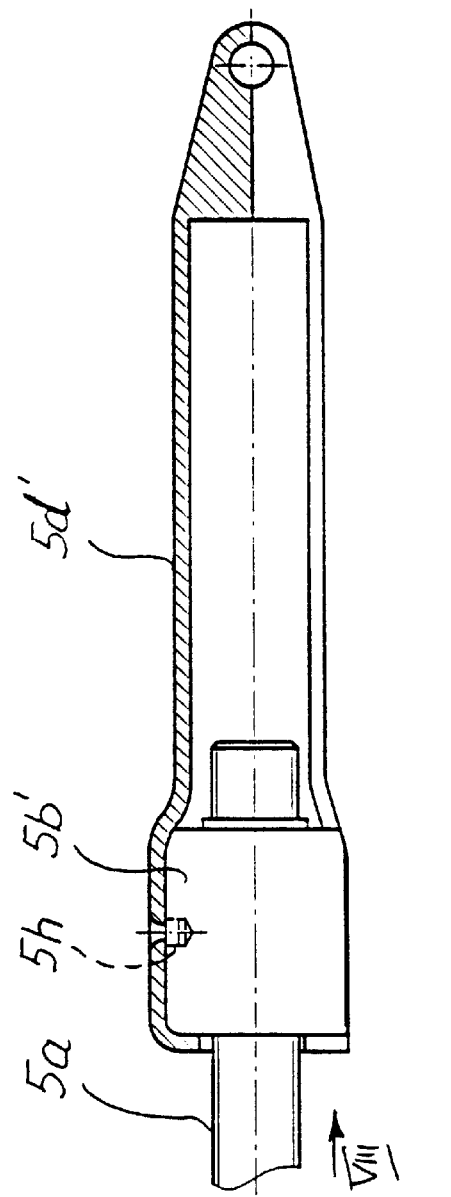
FIG. 7 shows a longitudinal section through a second embodiment of a dampening element in its original position.
Figure 8:
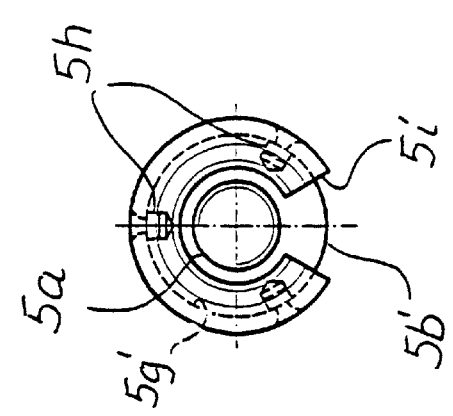
FIG. 8 shows a frontal view of the dampening element in the direction of the arrow VIII according to FIG. 7.
Figure 9:
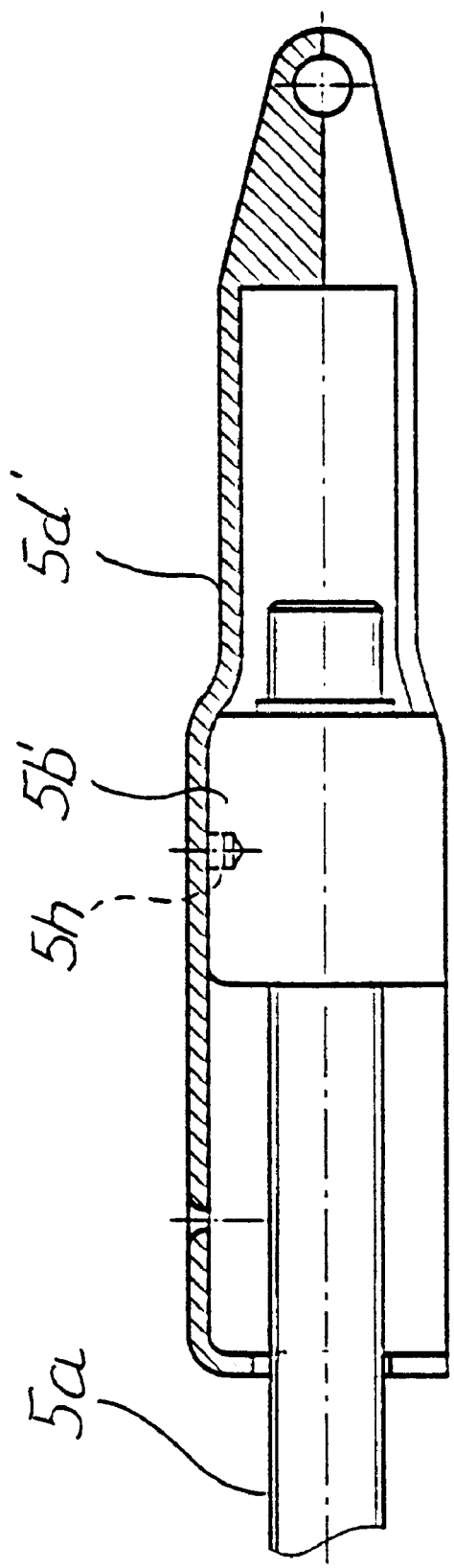
FIG. 9 shows the representation of the dampening element according to FIG. 7 after a collision.

The second embodiment of the dampening element 5, shown in FIGS. 7 through 9, differs from the first embodiment form mainly in the shape of the nut 5b' and the sleeve-shaped component 5d' which partially surrounds the nut 5b. The nut 5b' has a regular cylindrical outer surface. In its original position, shown in FIG. 7, the nut 5b' of component 5d with a corresponding internal diameter.

A portion of the sleeve-shaped component 5d adjacent to the nut 5b in the direction along which the nut 5b' moves tapers down to a section of pipe whose internal diameter is smaller than that of the external diameter of the nut 5b'. That portion of pipe holds the nut 5b' in its original position within the sleeve-shaped component 5d'. However, the internal diameter is sufficiently large to permit the threaded rod 5a to plunge into the sleeve-shaped component 5d'. The component 5d' has a slit 5i extending throughout its entire length.

Three shearing pins 5h are arranged at equal distances from one another around a circumference of sleeve-shaped component 5b' so that the nut cannot turn while it is in its original position in the sleeve-shaped component 5d'. In the event of a collision, the shearing pins 5h are sheared off, allowing the nut 5b' to move with the threaded rod 5a along its rotating axis (FIG. 9). The section of the sleeve-shaped component 5d' which has the small internal diameter is widened by this movement. Thus, the work of deforming the component 5d' consumes kinetic energy.

In a third embodiment of the dampening element 5, shown in FIG. 10, the sleeve-shaped component 5d is lined by a plastic sleeve 5k, with the exception of the area that houses the nut 5b" in its original position. The plastic sleeve 5k is made of high-resistance foam that offers resistance to movement of the nut 5b'. The nut 5b' is prevented from rotating in relation to the sleeve-shaped component 5d (not shown). In the event of a collision, the hard foam is deformed and compressed. Kinetic energy is consumed in this embodiment by the compression of the foam.

We claim:

1. A car seat comprising:
    a seat portion;
    a rail;
    a damping element having an articulated connection to the seat portion and the rail, the damping element including a threaded rod adapted to rotate through a nut secured with a sleeve-shaped component of the damping element during height adjustment of the seat portion, wherein the nut is adapted for axial movement along with the rod within the sleeve-shaped component in the event the damping element experiences an excessive load.

2. The car seat according to claim 1 wherein the sleeve-shaped component further comprises a plastic sleeve which concentrically surrounds the threaded rod.

3. The car seat according to claim 2 wherein the plastic sleeve is comprised of hard foam.

4. The car seat according to claim 1 wherein the sleeve-shaped component has an inner contour corresponding to an outer contour of the nut.

5. The car seat according to claim 1 wherein the sleeve-shaped component has a slit in the direction of a rotational axis of the nut.

6. The car seat according to claim 1 wherein the sleeve-shaped component has ribs directed radially inward.

7. The car seat according to claim 1 wherein the nut has a regular cylindrical outer surface and the sleeve-shaped component comprises a deformable pipe section having a diameter that decreases in size from an original position of the nut in a direction in which the nut is moved.

8. The car seat according to claim 1 wherein the nut is secured to the sleeve-shaped component by at least one shearing pin which prevents the nut from rotating.

9. A damping element for a car seat, comprising:
    a sleeve-shaped component having an opening at one end and an articulated connection at an opposite end, wherein the opposite end is fixed to a rail;
    a nut arranged in an original position proximate to the one end;
    a threaded rod adapted for rotating through the nut, wherein the nut is secured with the sleeve-shaped component; and
    an energy absorption element holding the nut in the original position in the sleeve-shaped structure, wherein the energy absorption element absorbs energy as the nut and the rod is forced towards the opposite end in the event the energy absorption element experiences an excessive load.

10. The dampening element according to claim 9 wherein the energy absorption element comprises ribs extending from the original position of the nut, inside the sleeve-shaped component, the ribs being directed radially inward.

11. The dampening element according to claim 9 wherein the nut has a regular cylindrical outer surface and the sleeve-shaped component has an inner contour corresponding to the outer surface of the nut and the energy absorption element comprises a deformable pipe section disposed within the sleeve-shaped component having a diameter that decreases in size from the original position of the nut toward the opposite end.

12. The dampening element according to claim 9 wherein the energy absorption element comprises a plastic sleeve arranged in the sleeve-shaped component, except in the original position of the nut, the plastic sleeve comprising a high-resistance foam.

13. A car seat as recited in claim 1, wherein the damping element is adapted to adjust the height of the car seat.

* * * * *